July 3, 1951  A. W. LUNDSTRUM  2,558,971
WATER HEATER
Filed Sept 17, 1945  2 Sheets-Sheet 1
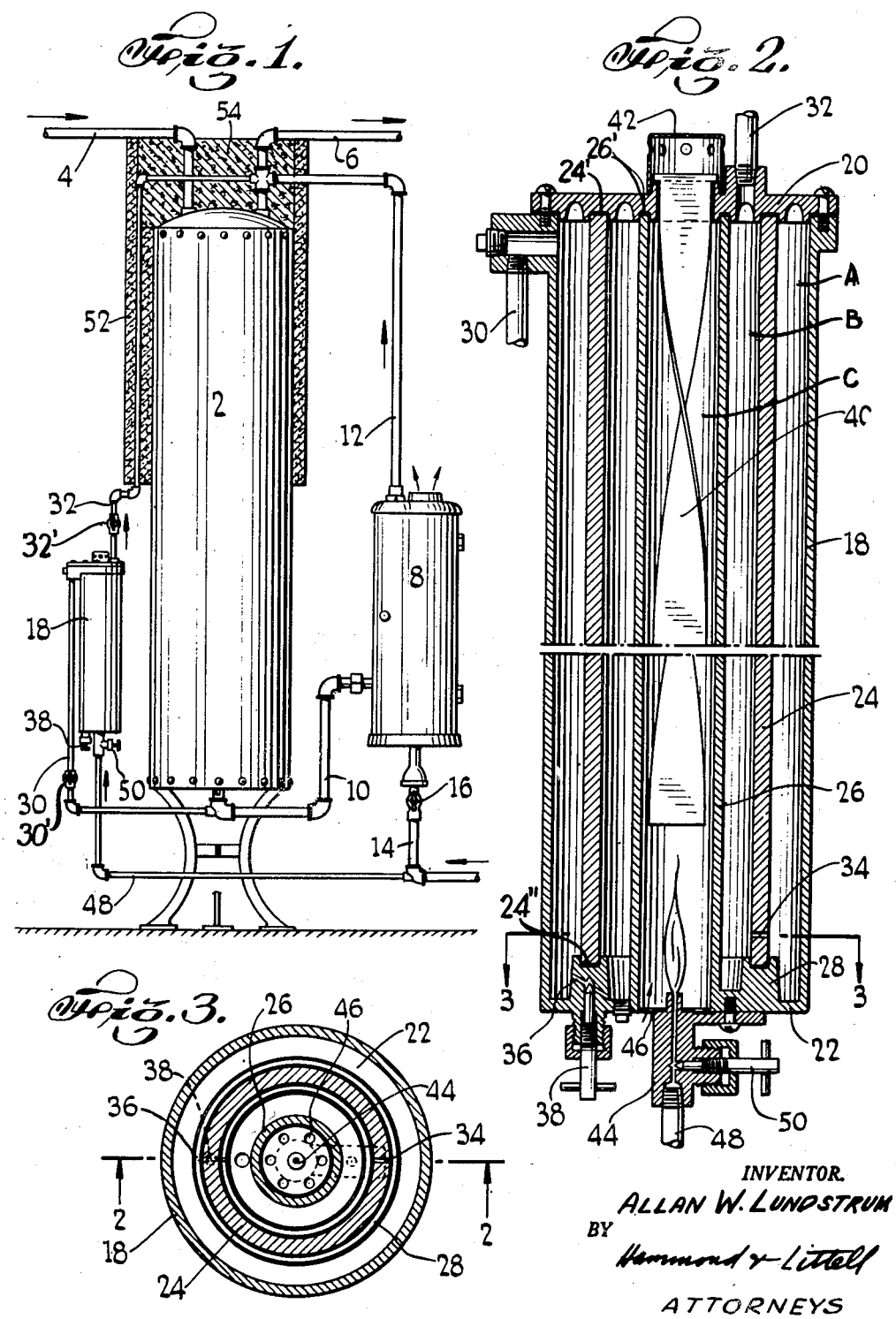
INVENTOR.
ALLAN W. LUNDSTRUM
BY
Hammond & Littell
ATTORNEYS July 3, 1951  A. W. LUNDSTRUM  2,558,971
WATER HEATER
Filed Sept. 17, 1945  2 Sheets-Sheet 2
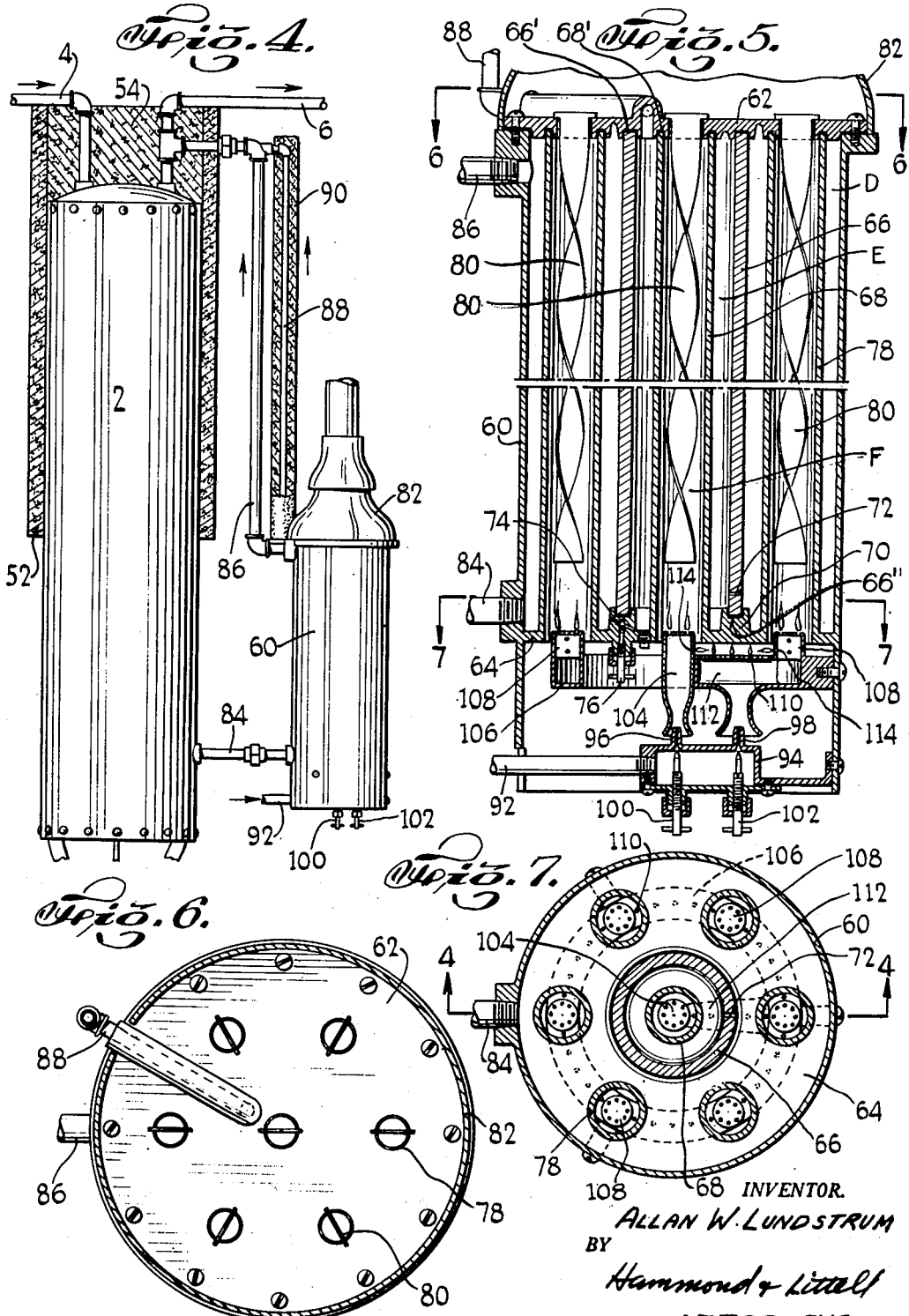
INVENTOR.
ALLAN W. LUNDSTRUM
BY
Hammond & Littell
ATTORNEYS Patented July 3, 1951

2,558,971

UNITED STATES PATENT OFFICE 2,558,971

WATER HEATER

Allan W. Lundstrum, Maplewood, N. J.

Application September 17, 1945, Serial No. 616,865

4 Claims. (Cl. 126—362)

This invention relates to a method of water heating and apparatus for water heating especially adapted for domestic use. Water heaters for homes, as now produced, are ordinarily either automatic or manual in their operation. Automatic water heaters maintain a constant supply of hot water or heat the water instantaneously whenever there is a demand for it, and such heaters involve a rather high installation cost since various thermostatic accessories are necessary. Furthermore, the operating cost of domestic heaters is high due to two fundamental factors:

1. Having a virtually unlimited supply of hot water available at all times makes it easy to use large quantities of hot water.
2. A full tank of hot water stored most of the time produces rather large standby losses.

Manually controlled heaters on the other hand are relatively inexpensive to install, and their operating cost is also low due to two fundamental factors:

1. That water is ordinarily heated as required which reduces standby losses to a negligible amount.
2. That the inconvenience of having to turn the heater on and off whenever water is required materially reduces the consumption of hot water in the home.

Manual heaters are inconvenient and fall far short of giving an entirely satisfactory water heating service. In spite of this, however, the great majority of domestic users of gas have the manual type heater installed, which indicates that regardless of the inconvenience involved, the cost of full automatic service as presently available is higher than most users are able or willing to pay.

One of the primary objects of this invention is to provide a method of water heating which will provide a reasonable supply of domestic hot water at a low cost with very little manual attention. This invention accomplishes the primary objects by the use of several basic principles:

1. Heat is supplied by a constantly burning flame of very low input (1,000 to 3,000 B. t. u.'s per hour) so that the maximum possible use of fuel is limited to a predetermined small amount.
2. The heater is designed so that it will deliver water at useable temperatures to the top of the tank after one trip through the heater. Hot water thus introduced into the storage tank will stratify and permit water at useable temperatures to be drawn off without the necessity of heating the entire contents of the tank to useable temperatures.

3. The efficiency of the system is high so that the maximum quantity of hot water will be produced with a given amount of fuel use, the high efficiency being obtained by two means, (a) because of the fixed input, the heater itself can be designed to have a very high efficiency, and (b) standby losses are minimized by storing only a small quantity of water at useable temperatures instead of a full tank.

4. Means are provided without the use of thermostatic controls which will prevent the possibility of dangerous overheating of water in the storage tank. This is accomplished in the invention by heavily insulating only the top portion of the storage tank in which hot water is ordinarily stored and insulating to a lesser degree, or leaving completely uninsulated, the lower portion of the tank which will permit heat to be radiated from the tank at the same rate as heat is put into the tank by the heater thus producing equilibrium at a safe water temperature.

5. Additional equipment can be provided adapted for use on present installations and can be installed without the necessity of draining water from the tank or cutting any water or gas pipes.

6. The utilization of a manually controlled high recovery water heater in combination with the low input auxiliary can be used in emergencies when an additional supply of hot water is required quickly.

In addition to providing equipment as auxiliary to existing non-automatic water heating installations, a further object of this invention is to provide equipment for original installations not now equipped with manually controlled heaters which will make possible the automatic and low cost advantages of the low input heater and provide a higher recovery manually controlled heater combined in one device whereby the low input heater can act as a pilot light for the high input heater.

The invention in general contemplates a water tank provided with a main manually controlled heater and an auxiliary heater. The auxiliary heater has a constantly burning flame of low intensity. Hot water from the auxiliary heater is conducted to the top of the tank. The upper half of the tank is insulated, while the lower half is left bare. Thus, if the auxiliary heater heats more water than can be held in the upper part of the tank, the water will pass into the lower part and its heat will escape through the bare walls. Overheating of the water is thus effectively prevented.

Further objects and advantages of the invention will appear more fully from the following description, especially when taken in conjunction with the accompanying drawings which form a part thereof.

In the drawings:

Fig. 1 shows in elevation, with parts in section, one modification of my system as applied to a usual existing installation.

Fig. 2 is a vertical cross-section through the auxiliary heater of Fig. 1 substantially on the line 2—2 of Fig. 3.

Fig. 3 is a horizontal cross-section substantially on the line 3—3 of Fig. 2.

Fig. 4 shows in elevation, with parts in section, another modification intended as an original installation.

Fig. 5 is a vertical cross-section through the heater unit of Fig. 4 substantially on the line 4—4 of Fig. 7.

Figs. 6 and 7 are horizontal cross-sections substantially on the lines 6—6 and 7—7 respectively of Fig. 5.

The ordinary manually controlled heater system, as shown in Fig. 1, is composed of a vertical tank 2 for holding a supply of water, with a cold water inlet 4 and a hot water outlet 6; and a heater unit 8 connected by pipe 10 to the bottom of tank 2 and by pipe 12 to the hot water pipe 6 just above the top of tank 2. Gas or any other suitable source of heat is fed by line 14 to the heater 8. A valve 16, or other suitable manual control, in the line 14 controls the flow of heating fluid to the heater 8.

The user, when he needs hot water, operates the manual control 16 and thus heats water in the heater 8. This water circulates by convection through pipes 10 and 12 until tank 2 is full of hot water. Valve 16 is then closed, until the hot water is wholly or partly used, or until its heat is lost through the walls of the tank.

The present invention, in the form shown in Figs. 1 to 3, provides a mechanism which can be readily applied to the standard heating installation just described.

The auxiliary heater is formed by a cylindrical casing 18 having upper and lower end walls 20 and 22. Concentric cylindrical shields 24 and 26 within the casing 18 divide it into outer chamber A, intermediate chamber B, and inner chamber C. The shields engage in grooves 24' and 26' in the top wall 20, and shield 24 also engages in groove 24' in an annular wall 28 extending upwardly from bottom wall 22. Shield 26 is integral with the bottom wall.

The outer chamber is connected at its top by a pipe 30 to pipe 10 and thus to the bottom of tank 2. The intermediate chamber is connected at its top by a pipe 32 to line 6 and thus to the top of tank 2. Pipes 30 and 32 are preferably considerably smaller than pipes 10 and 12. Suitable manual valves 30' and 32' may be provided in pipes 30 and 32 respectively. The outer and intermediate chambers communicate through a small passage 34 in shield 24 and through a passage 36 in wall 28. The size of passage 36 may be adjusted by a needle valve 38 carried by bottom wall 22. Since passages 34 and 36 are quite small, water can pass through only very slowly from one chamber to the other. The shield 24 also serves as an insulating means for the water in the intermediate chamber so as to retain heat therein. The shield may be of ceramic material.

The inner chamber is provided with a spiral baffle 40 extending downward from the top, above which is a perforated shield 42. In the bottom is a gas burner 44 around which are air inlet openings 46. Gas is supplied to burner 44 by a small pipe 48 connected to line 14. The flow of gas is controlled by a valve 50 in the gas passage of burner 44.

In the normal system, if insulated at all, the hot water tank is insulated uniformly all over. In the installation of the present invention, the upper part of the tank, which is the part of the water holding means to which hot water is fed by the auxiliary heater, is heavily insulated, while the lower part is insulated to a lesser degree preferably being left bare. For example, as shown in Fig. 1, the upper half of the tank is covered with an insulating sheathing 52 which extends above the tank. The top of the tank is covered with granular insulation 54 arranged within the extension of the sheath 52. Pipe 32 runs upward through sheath 52 and is insulated by it.

The device operates in the following manner:

When large quantities of hot water are desired, the main heater 8 is lit which heats the contents of the tank 2. Since the main heater is used only just before water is to be drawn from the tank, the lack of insulation on the lower portion will not cause substantial heat losses.

Between uses of the main heater 8, the gas burner 44 of the auxiliary heater burns continuously. This heats the water in the intermediate chamber which passes up through pipe 32 to the top of the tank 2. Cold water from the tank returns through pipe 30 and the outer chamber, where it is preheated to some extent by the water in the intermediate chamber. The auxiliary heater will gradually build up a supply of hot water in the top of the tank, from which small quantities can be drawn off as desired without lighting the main heater 8. If no water is used over a long period, the bottom level of hot water in tank 2 will gradually move down in the tank. However, as soon as the hot water extends below the insulating sheathing 52, and comes in contact with the bare tank walls, its heat will radiate off at an increasingly greater rate as the heat travels downwardly so that a safe temperature equilibrium is eventually reached. The flow of gas to the auxiliary heater is so adjusted that it cannot supply heat to the water faster than it can be radiated by the bare bottom half of the tank; or, in other words, when the tank has received a certain amount of heat, any further heat will be radiated off. In this way, overheating in the tank, which might cause dangerous steam formation, is effectively prevented; yet at the same time, the efficiency of the system as normally operated remains high.

Figs. 4 to 7 show a form of the device intended for original installation. The tank 2 and its insulation 52, 54, and inlet and outlet 4, 6 are like those of Figs. 1 to 3. However, the main and auxiliary heaters are constructed as a single unit.

This unit is composed of a cylindrical casing 60 having upper and lower end walls 62, 64 (Fig. 5). Within the casing are concentric cylindrical shields 66, 68, forming outer chamber D, intermediate chamber E, and inner or central chamber F. The inner chamber is open at top and bottom. The shields engage in grooves 66' and 68' respectively in the top wall 62. Shield 66 engages in a groove 66'' in a raised annular wall 70 on bottom wall 64, while shield 68 is integral with the bottom wall. Passages 72 and 74, in shield 66 and wall 70 respectively, connect the outer and intermediate chambers. Passage 74 may be controlled by a needle valve 76. Shield 66 also will serve as an insulator for the inner chamber and assist in the efficiency attained.

Through the outer chamber extend a plurality of vertical tubes 78, open at both ends through the top and bottom walls. Spiral baffles 80 extend downwardly into these tubes 78 and into the central chamber F from the top. Tubes 78 and the central chamber open into a collecting hood 82 above top wall 62.

Pipe 84 connects the bottom of the outer chamber to the bottom of tank 2. Pipe 86 runs from the top of the outer chamber to the hot water pipe 6 just above tank 2. Pipe 88 connects the top of the intermediate chamber to pipe 86 near its junction with pipe 6. Pipe 88 is jacketed by insulation 90 throughout most of its length.

Heating gas is supplied by pipe 92 to a distributing chamber 94 in the lower part of casing 60. Two nozzles, 96 and 98, controlled by valves 100 and 102 respectively, extend from distributor 94. Nozzle 96 extends into the lower end of a burner 104 located in the bottom of the inner chamber. Nozzle 98 extends into manifold 106 which supplies gas to a plurality of burners 108 in the lower ends of tubes 78. Manifold 106 has a series of openings 110 around it, and a lateral extension 112 to a point adjacent burner 104. Extension 112 also has holes 110. Burners 104 and 108 have laterally directed openings 114.

This modification operates in the same general manner as that of Figs. 1 to 3. The outer chamber constitutes the main heater, and the intermediate chamber, the auxiliary heater. Normally, valve 102 is closed and valve 100 is continuously open, so that burner 104 operates continuously. This maintains a supply of hot water in the top of tank 2, without overheating. When more hot water is needed, valve 102 is opened and gas flows to the manifold 106. The side openings 114 in burner 104 ignite the gas from openings 110 in the manifold extension 112, and the flames then spread to the whole manifold and all the burners 108. The auxiliary burner thus acts as a pilot for the main heater.

While I have described herein some embodiments of my invention, I wish it to be understood that I do not intend to limit myself thereby except within the scope of the appended claims.

I claim:

1. In a domestic hot water heating system, the combination comprising a substantially vertically extending elongated water holding tank, said tank affording free access of water from end to end, means insulating at least the upper portion of said tank, said insulating means being so constructed in thickness to create a materially great radiation difference between the upper portion and lower portion of the tank, a constantly operating water heating means, the portion of the tank below said upper insulating means having a radiation factor at least as great as the heating rate of said constantly operating water heating means, means to conduct water from said water holding tank to said heating means and from said heating means to the upper portion of said tank having said materially greater insulating means, whereby water circulates from said heating means to said tank, a manually controlled water heating means in addition to the constantly operating water heating means, and means to conduct water between said manually controlled heating means and said water holding tank.

2. In a domestic hot water heating system, the combination comprising a substantially vertically extending elongated water holding tank, said tank affording free access of water from end to end, means insulating at least the upper portion of the tank, said insulating means being so constructed in thickness to create a materially great radiation difference between the upper portion and lower portion of the tank, a constantly operating water heating means, the portion of the tank below said upper insulating means having a radiation factor at least as great as the heating rate of said constantly operating water heating means, and means to conduct water from said water holding tank to said heating means and from said heating means to the upper portion of said tank having said materially greater insulating means, whereby water circulates from said heating means to said tank.

3. A domestic heater having a casing with a heating passage through the center thereof providing an inner chamber, a cylindrical partition inside said casing dividing the same into outer and intermediate chambers, said partition having a restricting aperture therein, said partition having a second restricting aperture, valve means for adjusting the size of said second aperture, heating means within said inner chamber, heated water outlet means from said intermediate chamber to the exterior of said heater, and water inlet means to said outer chamber, water being heated in said intermediate chamber, water circulating from said outer chamber into said intermediate chamber as the heated water passes out through said heated water outlet.

4. A domestic water heater having a casing and a heating passage through the center thereof providing an inner chamber, a cylindrical shield inside said casing dividing the same into outer and intermediate chambers, said shield being made of an insulating material, a restricting passageway interconnecting said outer and intermediate chambers near the bottom thereof, a second restricting passageway interconnecting said outer and intermediate chambers, valve means for adjusting the size of said second passageway, heating means within said inner chamber, second heating means for heating water in said outer chamber, heated water outlet means adjacent the top of said intermediate chamber to the exterior of said heater, and water inlet means connected to said outer chamber, water being heated in said intermediate chamber and water circulating from said outer chamber into said intermediate chamber as the heated water passes out through said heated water outlet.

ALLAN W. LUNDSTRUM.

(References on following page)

REFERENCES CITED

The following references are of record in the file of this patent:

UNITED STATES PATENTS

| Number | Name | Date |
|---|---|---|
| 50,422 | McClosky | Oct. 10, 1865 |
| 430,823 | Bejsovec | June 24, 1890 |
| 1,107,534 | Lovekin | Aug. 18, 1914 |
| 1,128,534 | Schutz | Feb. 16, 1915 |
| 1,198,675 | Smythe | Sept. 19, 1916 |
| 1,206,789 | Adams | Dec. 5, 1916 |
| 1,237,403 | Stack | Aug. 21, 1917 |
| 1,338,760 | Wells | May 4, 1920 |
| 1,391,695 | Sachse | Sept. 27, 1921 |
| 1,406,044 | Lindberg | Feb. 7, 1922 |
| 1,618,735 | Storey | Feb. 22, 1927 |
| 1,630,890 | Coates | May 31, 1927 |
| 1,654,935 | Holmes | Jan. 3, 1928 |
| 1,662,507 | Morrow | Mar. 13, 1928 |
| 1,717,207 | Halle | June 11, 1929 |
| 1,790,357 | Stack | Jan. 27, 1931 |
| 1,841,230 | Vuia et al. | Jan. 12, 1932 |
| 2,224,081 | Jung | Dec. 3, 1940 |
| 2,225,606 | Beauvais | Dec. 24, 1940 |

FOREIGN PATENTS

| Number | Country | Date |
|---|---|---|
| 152,224 | Great Britain | Oct. 14, 1920 |
| 634,454 | Germany | Apr. 15, 1932 |